United States Patent [19]
Varakian et al.

[11] Patent Number: 6,056,146
[45] Date of Patent: May 2, 2000

[54] SPLATTER SCREEN

[75] Inventors: Robert A. Varakian, Pine Brook, N.J.; Karen Swinford, Schaumburg, Ill.; Patricia A. Filkins, Arlington Heights, Ill.; Randall Bell, River Forest, Ill.; James Hand, Glen Ellyn, Ill.

[73] Assignee: Ekco Housewares, Inc., Franklin Park, Ill.

[21] Appl. No.: 09/225,266

[22] Filed: Jan. 5, 1999

[51] Int. Cl.[7] ...................................................... B65D 51/16
[52] U.S. Cl. .......................... 220/370; 220/573.1; 220/731; 220/212.5; 99/341; 99/422; 99/645; 126/299 C; 126/383
[58] Field of Search .................................... 220/369, 370, 220/371, 372, 573.1, 731, 912, 212.5; 99/341, 422, 645; 126/299 C, 383

[56] References Cited

U.S. PATENT DOCUMENTS

| | | |
|---|---|---|
| D. 302,637 | 8/1989 | Hiscott et al. . |
| 1,664,564 | 4/1928 | Lipner ................................. 220/372 X |
| 2,498,534 | 2/1950 | Drum ...................................... 220/370 |
| 2,770,389 | 11/1956 | Drakoff ............................. 220/731 X |
| 3,452,895 | 7/1969 | Kalkowski ............................. 220/370 |
| 3,598,105 | 8/1971 | Cristaldi . |
| 3,807,596 | 4/1974 | Baker . |
| 3,809,281 | 5/1974 | Kalkowski . |
| 3,952,374 | 4/1976 | Mohorovich . |
| 4,000,830 | 1/1977 | French . |
| 4,103,420 | 8/1978 | Davis . |
| 4,189,993 | 2/1980 | Kaufman . |
| 4,721,140 | 1/1988 | Coker . |
| 4,747,392 | 5/1988 | Rogers . |
| 5,012,071 | 4/1991 | Henke . |
| 5,531,354 | 7/1996 | Uy ........................................... 220/731 |
| 5,542,347 | 8/1996 | Joseph . |
| 5,724,885 | 3/1998 | Uy . |

*Primary Examiner*—Stephen K. Cronin
*Attorney, Agent, or Firm*—Wolf, Greenfield & Sacks, P.C.

[57] ABSTRACT

A splatter screen may be releasably retained to a cookware item to prevent splatter of hot food items and the like from the cookware item during cooking. A rim of the splatter screen is constructed and arranged to be releasably retained within an upper rim portion of the cookware item. Any number of spring clips may be attached to the rim of the splatter screen for releasably retention of a cover of the cookware item to the splatter screen. A grip portion of a handle, attached to the rim of the splatter screen, is constructed and arranged to accommodate a handle of the cookware item with which the splatter screen is intended to be used.

12 Claims, 4 Drawing Sheets

SPLATTER SCREEN

FIELD OF THE INVENTION

This invention relates generally to cookware items and, more particularly, to a splatter screen for use with cookware items. In one embodiment, the splatter screen of the invention may be stably placed on top of a cookware item and can releasably retain thereto a cover of the cookware item.

BACKGROUND OF THE INVENTION

During the cooking of food within a cookware item such as a pot or pan, splattering of high temperature grease, oil or food may occur. This occurrence presents a risk of burn to any person standing in the vicinity of the cookware item. This occurrence also causes surroundings to be soiled.

To prevent such splattering, it is known to employ the use of a splatter screen over the cookware item. U.S. Pat. No. 3,807,596 describes an exemplary prior art splatter screen. The splatter screen includes a circular metallic rim, a handle attached to the rim, and an aluminum screen retained within the rim. During use, the splatter screen is placed loosely on top of a frying pan to prevent splatter from the pan.

The prior art splatter screen is in no way retained to the pan and is held in place only by the force of gravity. Thus, there is risk that the splatter screen may fall off of the pan when the pan is lifted, moved, bumped, etc. In addition, the prior art splatter screen has no feature for accommodating a lid or cover of the frying pan. If the lid or cover is desired to be used, it must simply be placed on top of the splatter screen where it rests loosely and is retained only by the force of gravity.

SUMMARY OF THE INVENTION

The splatter screen of the present invention may be releasably retained to a cookware item such that when the cookware item is lifted, moved or bumped, the splatter screen remains attached to the cookware item. The splatter screen of the invention also provides for releasable attachment of a cover of the cookware item to the splatter screen. In an embodiment, the splatter screen is retained to the cookware item securely enough such that the cookware item can be flipped upside down, in order to use the splatter screen as a strainer. In addition, because the splatter screen of the invention may releasably retain a cover of the cookware item thereto, the splatter screen need not be removed in order to use the cover of the cookware item during cooking. The cookware item incorporating the splatter screen of the invention provides for an aesthetically pleasing cookware item.

In one aspect, the present invention provides a splatter screen comprising a rim, a wire mesh screen retained within the rim, and at least one spring clip attached to the rim.

In one embodiment, the spring clip comprises a first portion extending upwardly from the rim, a second portion, contiguous with the first portion, and extending outwardly from the rim, and a third portion, contiguous with the second portion, and extending inwardly toward a center of the rim. The spring clip is adapted to flex inwardly upon engagement with a cover lid to releasably retain the cover lid on the rim. In other embodiments, the spring clip is attached to the rim using one of a screw, bolt, rivet, molding and welding. In certain other embodiments, four spring clips are attached to the rim and are spaced about the rim.

In another aspect, the present invention provides a splatter screen comprising a rim, a wire mesh screen retained within the rim, and a handle attached to the rim, wherein the handle comprises a hand-grip such that a portion of the hand-grip is constructed so as to accommodate a handle of a cookware item when the splatter screen is placed over the cookware item.

In one embodiment, the hand-grip has a substantially U-shaped cross-section. In another embodiment, the hand-grip comprises a top portion for contacting a palm of a hand and two side portions extending downwardly from the top portion, the two side portions being substantially parallel to, and spaced apart from, one another, such that a cookware item handle can be received between the two side portions. In other embodiments, the splatter screen of the invention further comprises at least one spring clip attached to the rim and extending upwardly from the rim. In certain other embodiments, the spring clip comprises a first portion extending upwardly from the rim, a second portion, contiguous with the first portion, and extending outwardly from the rim, and a third portion, contiguous with the second portion, and extending inwardly toward a center of the rim. The spring clip is adapted to flex inwardly upon engagement with a cover lid to releasably retain the cover lid on the splatter screen. In yet other embodiments, the spring clip is attached to the rim using one of a screw, bolt, rivet, molding and welding. In further embodiments, four spring clips are attached to the rim and are spaced about the rim.

Another embodiment of the invention is directed to a splatter screen that includes a rim and a wire mesh screen retained within the rim. The rim includes at least one portion constructed and arranged to be releasably retained to an upper rim of a cookware item.

In an embodiment, the rim includes a lower portion having a shape substantially similar to the shape of the upper rim of the cookware item and a diameter slightly less than that of the upper rim of the cookware item.

In an embodiment, the rim also includes an upper portion having a shape substantially similar to the shape of the lower portion and a diameter greater than the diameter of the lower portion.

The features and advantages of the present invention will be more readily understood and apparent from the following detailed description of the invention, which should be read in conjunction with the accompanying drawings and from the claims which are appended to the end of the detailed description.

DETAILED DESCRIPTION

The splatter screen of the invention includes a rim, a handle and a wire mesh screen retained within the rim. In one embodiment of the invention, as will be described in more detail below, the rim is constructed and arranged to enable the splatter screen to be releasably retained within an upper rim of a cookware item. In an embodiment of the invention, the splatter screen includes at least one spring clip attached to the rim so as to enable a cover of the cookware item to be releasably retained to the splatter screen. In an embodiment of the invention, the handle of the splatter screen is constructed and arranged so as to mate with the handle of the cookware item with which the splatter screen is being used.

Figure 1:
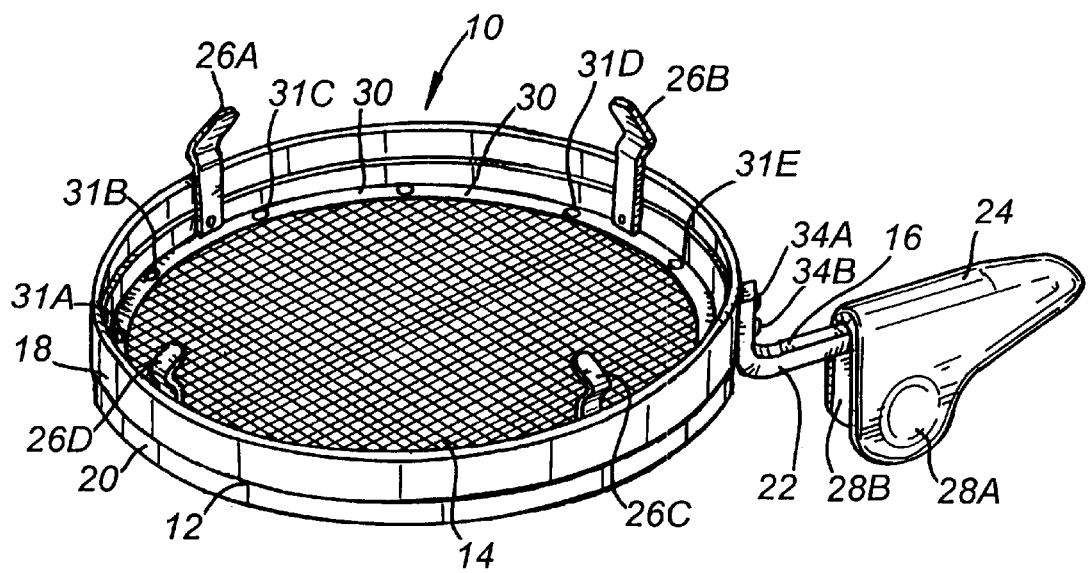
FIG. 1 is a perspective view of a splatter screen according to one embodiment of the invention.

One embodiment of the splatter screen of the invention is shown in FIG. 1. As shown, the splatter screen 10 includes a circular rim 12, a wire mesh screen 14 retained within the circular rim 12, and a handle 16 attached to the rim 12.

In this exemplary embodiment, rim 12 includes an upper portion 18 and a lower portion 20. Both upper portion 18 and lower portion 20 are circular in shape but the invention is not so limited. The rim may be of any shape. It is envisioned that the rim be of similar shape to an upper rim portion of a cookware item with which the splatter screen is intended to be used.

In one embodiment, lower rim portion 20 has a diameter slightly less than a diameter of the upper rim of a cookware item with which it is intended to be used such that lower rim portion 20 may be placed within the upper rim portion of the cookware item and be releasably retained within the cookware item, as will be described with reference to FIG. 5. In one embodiment, upper rim portion 18 has a diameter slightly larger than that of lower rim portion 20 and is concentric thereto such that the splatter screen will not fall within the cookware items.

Figure 2:
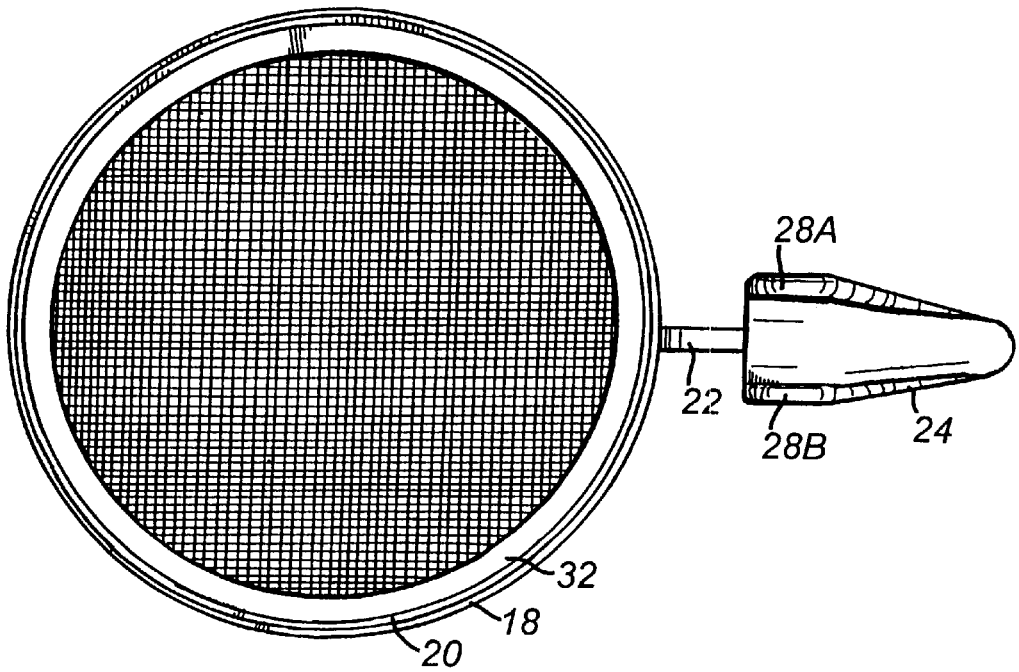
FIG. 2 is a bottom view of the splatter screen of FIG. 1.

In one embodiment, the rim includes an inner upper rim portion 30 and an inner lower rim portion 32, as shown respectively in FIGS. 1 and 2. In this exemplary embodiment, inner upper rim portion 30 and inner lower rim portion 32 are circular in shape and extend inwardly from the point where upper rim portion 18 and lower rim portion 20 meet.

In an embodiment, wire mesh screen 14 is retained to the rim by having its edge sandwiched between inner upper rim portion 30 and inner lower rim portion 32. In an embodiment, the inner upper rim portion 30 and inner lower rim portion 32 may be attached to one another such as with rivets, with the edge of the wire mesh screen 14 sandwiched therebetween. The rivets are shown in FIG. 1 and labeled 31A–31E. In an embodiment, eight rivets are used, but the invention need not be so limited. The wire mesh screen may be attached to the rim by any mechanical attachment mechanism suitable for metals such as screws, nuts and bolts, welding, soldering and the like.

Handle 16 includes a neck portion 22 and a grip portion 24. Neck portion 22 has a substantially L-shaped construction and is attached to rim 12. In this exemplary embodiment, handle 22 is attached to rim 12 by screws 34A and 34B. The invention need not be so limited. Handle 12 may be attached to the rim by any means suitable for secure attachment of the handle to the rim such as by screws, rivets, nails, nuts and bolts, welding, soldering and the like.

Rim 12, wire mesh screen 14, neck portion 22 of handle 16, and neck portion 22 of handle 16 may be made from metal alloys such as aluminum. Other metals which may withstand high temperatures also are suitable. Grip portion 24 of handle 16 may be made from rubber. Grip portion 24 should be made from a material which has good heat retardant qualities such that it is not hot-to-the-touch.

Grip portion 24 has an end portion 25 which extends downwardly from a center portion thereof as the grip extends in a direction away from the splatter screen as such, grip portion 24 can accommodate comfortably of a person's palm when the person grabs grip portion 24 with his or her hand. Grip portion 24 also has two downwardly extending side members 28A and 28B, spaced from one another. Side members may be gripped by a person's thumb and his or her remaining fingers, respectively. As will be described in more detail below with reference to FIG. 5, the space between downwardly extending side members 28A and 28B of grip portion 24 can accommodate a handle of a cookware item with which the splatter screen is being used.

In this embodiment, the splatter screen includes spring clips attached to the rim which enable a cover of a cookware item to be releasably retained to the splatter screen. The splatter screen is shown including four spring clips 26A–26D. Each spring clip is attached to an inside surface of rim 12 and extends upwardly therefrom so that it extends above the upper surface of upper portion 18 of rim 12. While four spring clips are shown, the invention need not be so limited. Any number of spring clips may be used.

The spring clips preferably are made from metal. The spring clips may be made from any material which has elastic qualities yet is strong enough to releasably retain a cookware item cover thereto.

FIG. 2 is a bottom view of the splatter screen 10 of the invention illustrating inner lower portion 32 of rim 12 as well as the upper and lower concentric rim portions 18 and 20, respectively, of rim 12. Also shown in FIG. 2 are the downwardly extending side portions 28A and 28B of grip portion 24 of handle 16. This view clearly illustrates the space between the downwardly extending side portions 28A and 28B, intended for accommodating a handle of a cookware item.

Figure 3:
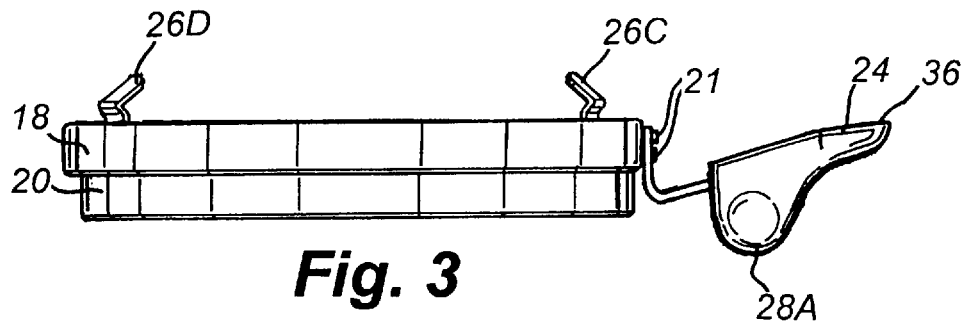
FIG. 3 is a side view of the splatter screen of FIG. 1.

FIG. 3 is a side view of the splatter screen 10 of FIG. 1 clearly illustrating the upper and lower concentric rim portions 18 and 20, respectively. This view illustrates that upper portion 18 has a larger diameter than lower portion 20. As stated, the outer diameter of lower portion 20 may be approximately equal to or slightly less than the inner diameter of an upper rim portion of a cookware item with which the splatter screen is intended to be used. Thus, the lower rim portion 20 may be placed within, and retained to, the upper rim portion of a cookware item, as will be described with reference to FIG. 5. The outer diameter of upper rim portion 18 may be slightly larger than the inner diameter of the upper rim portion of the cookware item such that the underneath surface 19 of the upper rim portion 18 rests against the upper surface of the upper rim portion of the cookware item to prevent the splatter screen from falling in the cookware item.

Figure 4:
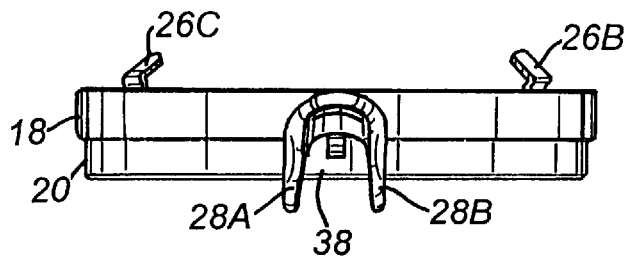
FIG. 4 is a rear view of the splatter screen of FIG. 1.

FIG. 4 is a rear view of the splatter screen 10 clearly illustrating the space 38 between downwardly extending side members 28A and 28B of grip portion 24 of handle 16.

Figure 5:
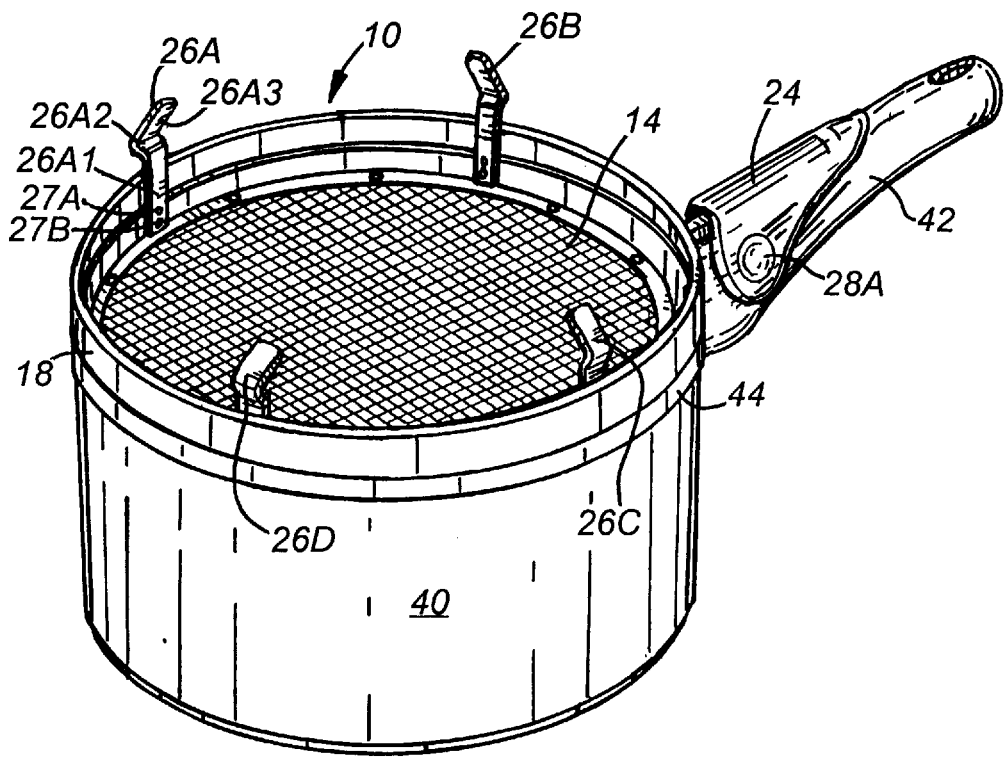
FIG. 5 is a view of the splatter screen of FIG. 1 as placed on a cookware item.

FIG. 5 illustrates splatter screen 10 of FIG. 1 when releasably attached to a cookware item 40. In this illustrative example, cookware item 40 may be a pot or a pan and includes a handle 42 and an upper rim 44. The inner diameter of upper rim 44 is slightly larger than the outer diameter of lower rim portion 20 and is less than the outer diameter of upper rim portion 18. When splatter screen 10 is placed on cookware item 40, lower rim portion 20 of splatter screen 10 extends within upper rim portion 44 of cookware item 40 and outer surface of lower rim portion 20 contacts inner surface of upper rim 44 such that splatter screen 10 is releasably retained to cookware item 40. Lower surface 19 of upper rim portion 18 rests against the upper surface of upper rim portion 44 of cookware item 40 preventing the splatter screen from falling in the cookware item.

Downwardly extending side members 28A and 28B extend over each side of handle 42 such that handle 42 extends within space 38 between side members. The width of handle 42 may be approximately equal to or slightly less than the distance between inner surfaces of side members 28A and 28B such that the inner surfaces of side members 28A and 28B contact the outer surfaces of the sides of handle 42. Grip member 24 of handle 16 is in this way releasably retained to handle 42 of cookware item 40.

The described and shown construction of grip member 24 enables a person using the cookware item to grasp the handle 42 as well as the grip member 24 with relative case as the grip member 24 mates with the handle 42. The releasable retention of the splatter screen 10 to the cookware item 40 is strong enough such that it enables a user to move, bump and even flip the cookware item without releasing the splatter screen from the cookware item. This enables the splatter screen to be used as a strainer, if desired. To remove the splatter screen from the cookware item, one would simply pull the splatter screen from the cookware item such as by the handle, for example.

FIG. 5 also illustrates in more detail the spring clips 26A–26D of the invention. Each spring clip is of similar construction and will be described with reference to spring clip 26A. Spring clip 26A includes a lower linearly extending elongate portion 26A1, a central outwardly extending portion 26A2 that then curves inwardly as it extends upwardly, forming a lip, and an upper inwardly extending portion 26A3. The spring clip is designed to accommodate a cover of the cookware item as the cover is placed over the splatter screen.

Figure 6:
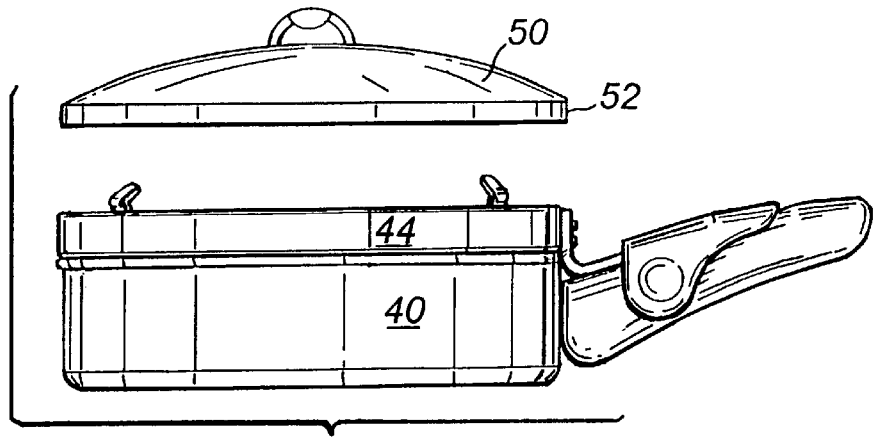
FIG. 6 is a side view of the splatter screen of FIG. 1 as placed on a cookware item with the lid about to be placed on the cookware item as well.

As shown in FIG. 6, a cover 50 of splatter screen 40 may include a circular lower rim portion 52. As the cover 50 is placed downwardly on top of splatter screen 10, an inner surface (not shown) of rim 52 first contacts the outer surface of upper portion 26A3 of spring clip 26A (as well as the outer surface of the upper portion of each of the other spring clips). The continued downward motion of the cover causes each spring clip to flex inwardly until the inner surface of the rim of the cover lid extends over the lip 26A2 of spring clip 26A (as well as the lips of the other spring clips). Further downward motion of the cover causes the rim of the cover to extend between lower portion 26A1 of spring clip 26A (and the lower portions of the other spring clips) and an inner surface of upper rim portion 18, enabling spring clip 26A (and the other spring clips) to flex outwardly against the inner surface of the rim such that the rim of the cover is releasably retained to the splatter screen.

In one embodiment, each spring clip 26A–26D is retained to rim 12 in the same manner. This will be described and shown only with respect to spring slip 26A. In one embodiment, spring clip 26A is retained to rim 12 by attaching lower portion 26A1 of spring lip 26A to an inner surface of lower rim portion 20 with rivets 27A and 27B. The invention need not be so limited. Any attachment mechanism that securely retains lower portion of each spring clip to the rim is suitable. Such other attachment mechanisms include screws, nuts and bolts, welding, soldering and the like.

Figure 7:
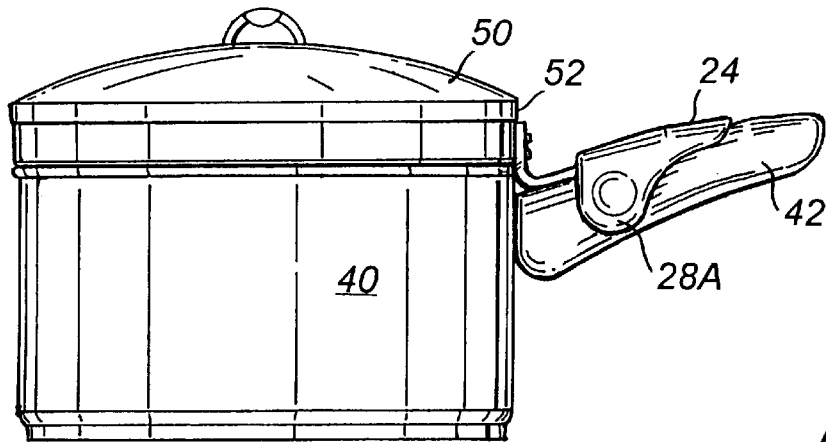
FIG. 7 is a side view of the splatter screen of FIG. 6 with the lid fully placed on the cookware item.

FIG. 7 shows a splatter screen 10 releasably attached to cookware item 40 and cover 50 releasably attached to the splatter screen.

Figure 8:
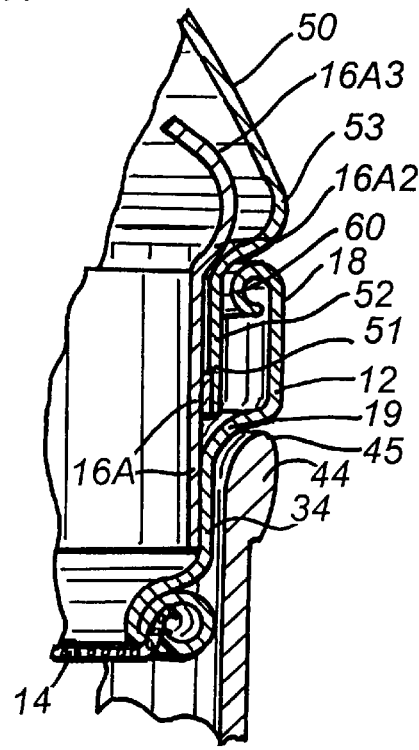
FIG. 8 is a partially cut away cross-sectional view of the splatter screen as placed on a cookware item with the lid also retained on the splatter screen, as shown in FIG. 7.

FIG. 8 is a partially cut away cross-sectional view of FIG. 7 illustrating the intercouplings of the spring clip 26A, rim 52 of cover 50, rim portions 18 and 20 of splatter screen 10, and upper rim portion 44 of cookware item 40. As shown, rim 52 of cover 50 is sandwiched between lower portion 26A1 of spring clip 26A and rim 20. The straight downwardly extending portion 51 of the rim 52 is located at a position lower than the lip 26A2 of spring clip 26A. Shoulder 53 of rim 52 of cover 50 is located at about the same level of lip 26A2 of spring clip 26A, enabling lip 26A2 of spring clip 26A to flex outwardly against inner surface of shoulder 53 of rim 52. Rim portion 12 of splatter screen 10 includes lower portion 20 and upper portion 18. Upper portion 18 includes an upper rim portion 60 having a curled configuration. An outer surface of curl 60 extends against rim 52 at a portion just downwardly from shoulder 53. Lower portion 20 is located just inside rim 44 of cookware item 40 and lower surface 19 of upper rim portion 18 rests against upper surface 45 of rim portion 44, thereby retaining splatter screen on rim 44 of cookware item 40. While upper rim portion 60 is shown including a curled configuration, it should be appreciated that the upper rim portion need not be curled.

Figure 9:
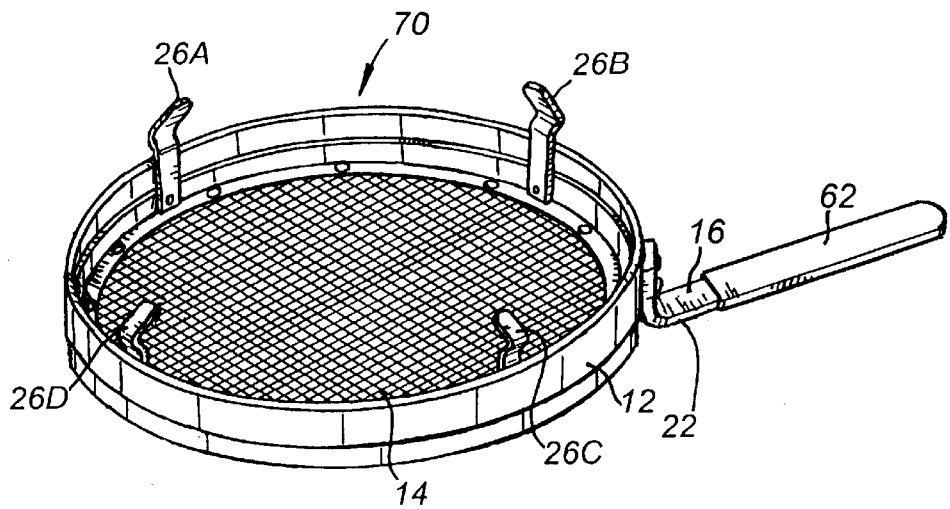
FIG. 9 is a perspective view of the splatter screen according to an alternate embodiment of the invention.
Figure 10:
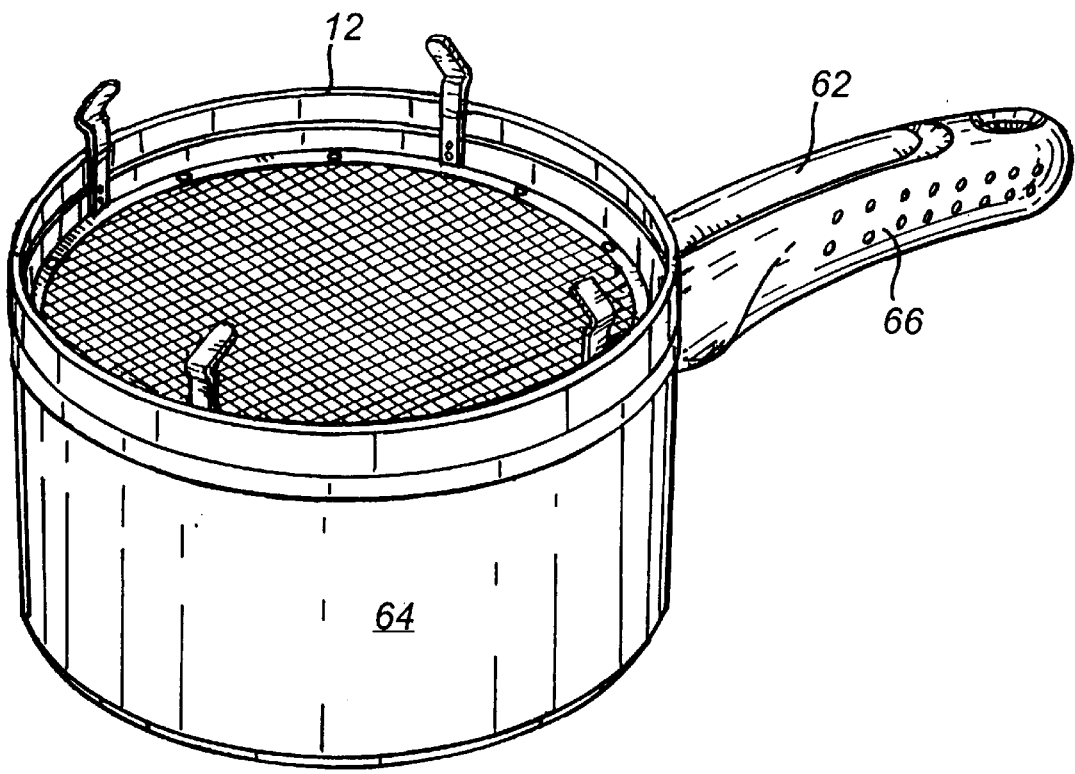
FIG. 10 is a view the splatter screen of FIG. 9 as placed on a cookware item.

FIG. 9 is a perspective view of a splatter screen 70 according to another embodiment of the invention. This embodiment is identical to the embodiment shown in FIG. 1 except for the grip portion 62 of handle 16. In this embodiment grip portion 62 of handle 16 is a substantially flat, elongate member which can be easily gripped by a person's hand and which can be placed on the top of a handle 66 of a cookware item 64, as shown in FIG. 10.

It should be appreciated that any handle design, including a grip portion that is constructed to accommodate a handle of a cookware item with which the splatter screen is intended to be used, is envisioned. The invention need not be limited to the grip portion designs shown and disclosed herein.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A splatter screen comprising:
   a rim;
   a wire mesh screen retained within the rim; and
   four spring clips attached to the rim and spaced about the rim;
   each spring clip comprises:
   a first portion extending upwardly from the rim;
   a second portion, contiguous with the first portion, and extending outwardly from the rim; and
   a third portion, contiguous with the second portion, and extending inwardly toward a center of the rim;
   wherein each spring clip is adapted to flex inwardly upon engagement with a cover lid to releasably retain the cover lid on the rim.

2. A splatter screen comprising:
   a rim;
   a wire mesh screen retained within the rim; and a handle attached to the rim, wherein the handle comprises a hand-grip including a cut-out section that receives within the cut-out section a handle of a cookware item when the splatter screen is placed over the cookware item.

3. The splatter screen of claim 2, wherein the hand-grip has a substantially U-shaped cross-section, when the cross-section is taken along a line substantially perpendicular to a longitudinal length of the hand-grip.

4. The splatter screen of claim 2, wherein the hand-grip comprises:

a top portion for contacting a palm of a hand; and two side portions extending downwardly from the top portion, the two side portions being substantially parallel to, and spaced apart from, one another, such that a cookware item handle can be received between the two side portions.

5. The splatter screen of claim 2, further comprising at least one spring clip attached to the rim and extending upwardly from the frame.

6. The splatter screen of claim 5, wherein the at least one spring clip comprises:

a first portion extending upwardly from the rim;

a second portion contiguous with the first portion extending outwardly from the rim; and a third portion contiguous with the second portion extending inwardly toward a center of the rim.

7. The splatter screen of claim 6, wherein the at least one spring clip is adapted to flex inwardly upon engagement with a cover lid to releasably retain the cover lid on the rim.

8. The splatter screen of claim 7, wherein the at least one spring clip is attached to the rim using one of a screw, bolt, rivet, molding and welding.

9. The splatter screen of claim 8, wherein four spring clips are attached to the rim and are spaced about the rim.

10. A splatter screen comprising:

a rim; and a wire mesh screen retained within the rim;

wherein the rim includes an upper one portion constructed and arranged to receive and releasably retain thereon a lid of a cookware item, and a lower portion constructed and arranged to be received within and be releasably retained to an upper rim of the cookware item, and wherein an outer diameter of the upper portion is not equal to an outer diameter of the lower portion.

11. The splatter screen of claim 10, wherein the lower portion has a shape substantially similar to the shape of the upper rim of the cookware item and a diameter slightly less than that of the upper rim of the cookware item.

12. The splatter screen of claim 11, wherein the upper portion has a shape similar to the shape of the lower portion and the outer diameter greater than that of the lower portion.

* * * * *